United States Patent [19]
Tsumura

[11] Patent Number: 6,018,726
[45] Date of Patent: Jan. 25, 2000

[54] METHOD OF BILLING FOR INFORMATION SERVICES IN CONJUNCTION WITH UTILITIES SERVICE

[75] Inventor: Mihoji Tsumura, Osaka, Japan

[73] Assignee: Ricos Co., Ltd., Japan

[21] Appl. No.: 08/997,123

[22] Filed: Dec. 23, 1997

Related U.S. Application Data

[62] Division of application No. 08/163,933, Dec. 8, 1993, Pat. No. 5,729,740.

[30] Foreign Application Priority Data

| Dec. 10, 1992 | [JP] | Japan | 4-352932 |
| Dec. 25, 1992 | [JP] | Japan | 4-358308 |
| Mar. 3, 1993 | [JP] | Japan | 5-69337 |
| Mar. 26, 1993 | [JP] | Japan | 5-92072 |
| Mar. 26, 1993 | [JP] | Japan | 5-92073 |

[51] Int. Cl.$^7$ .................................................. G06F 17/00
[52] U.S. Cl. .................... 705/412; 455/406; 379/106.03; 379/114; 379/130
[58] Field of Search ................................... 705/400, 412; 455/406; 379/106.03, 114, 130; 364/528.11

[56] References Cited

U.S. PATENT DOCUMENTS

| 4,126,762 | 11/1978 | Martin et al. | 179/2 |
| 4,463,354 | 7/1984 | Sears | 340/870.02 |
| 4,707,852 | 11/1987 | Jahr et al. | 379/107 |
| 4,803,632 | 2/1989 | Frew et al. | 364/464.04 |
| 4,804,957 | 2/1989 | Selph et al. | 340/870.03 |
| 4,940,976 | 7/1990 | Gastouniotis et al. | 340/870.02 |
| 5,056,107 | 10/1991 | Johnson et al. | 375/1 |
| 5,218,552 | 6/1993 | Stirk et al. | 364/492 |
| 5,729,740 | 3/1998 | Tsumura | 395/615 |

OTHER PUBLICATIONS

"Will AMR Ever Get Off the Ground?", Electrical World, vol. 206, No. 10, p. 54, Oct. 1992.
"Utility Meter Reading Goes Electronic: $800 Million Systems Market Predicted", Phillips Publishing Inc., May 23, 1988.
Mary J. Pitzer, "Will Meter Readers Go the Way of Milk Wagons?", Business Week, No. 2985, p. 104H, Feb. 16, 1987.
V. H. Frauenhofer, "Reading Meters by Radio", Pipeline Gas J., vol. 213:11, pp. 14–15, Nov. 1986.
News Briefs, "Data Compresssion for IBM", PC Week, vol. 5, No. 44, p. C4 (2), Oct. 1988.
"Business Communications: Challenges for the '80s", Fortune, vol. 107, p. 37 (22), Apr. 4, 1983.

*Primary Examiner*—Allen R. MacDonald
*Assistant Examiner*—Susanna Meinecke-Diaz
*Attorney, Agent, or Firm*—Thompson Hine & Flory LLP

[57] ABSTRACT

A system for automatically billing information services in conjunction with utilities services. The system includes a main unit having a host computer with a database for storing data of various types, and a transceiver for radio communications. The system also includes a plurality of terminal units for receiving said data of various types. In operation, the main unit transmits data tagged with a unique data identification code, and each of the plurality of terminal units is provided with a utilization status counter for storing data identification codes of data actually executed. Each terminal unit then calculates service fee based on the stored data identification codes in the utilization status counter referring to fee conversion data which the main unit transmits at regular intervals. Service fee information is sent to a fee conversion adaptor connected to said terminal unit, and a signal provided from the adaptor is used to control the integrating meter which indicates the rate of usage of a public utility.

13 Claims, 9 Drawing Sheets

| a | b | c | d | e | f |

FIG. 8

METHOD OF BILLING FOR INFORMATION SERVICES IN CONJUNCTION WITH UTILITIES SERVICE

This application is a divisional of application Ser. No. 08/163,933, filed Dec. 8, 1993, now U.S. Pat. No. 5,729,740.

BACKGROUND OF THE INVENTION

1. Field of the Invention

The present invention is directed to technical arrangements which provide an efficient billing system of service rates on an individual piece-of-information basis or on a unit-of-information basis in a variety of information services. The services may range from music to video to text, including news transmitted by means of radio communications, particularly by satellite communications. The present invention is also directed to a billing system for public utilities rates.

2. Description of the Prior Art

Radio broadcasting, television broadcasting, and satellite communications using communications satellites are now in widespread use. Billing service fees, and then collecting them in a timely manner, are the major problems associated with radio communications, because radio communications are not provided with the comparable system that is normally used by telephone lines where communications are performed on the basis of handshake under the control of telephone exchanges. In television broadcasting, it is a common and established practice to bill and collect fees associated with each television set based on the assumption that available channels are selected and watched on the television set by viewers or users since it was installed. There are some systems, now in use, of satellite broadcasting service, in which signals are scrambled before transmission, and the user terminal is equipped with a de-scrambler which de-scrambles the received signal. In this case, a predetermined monthly rate of fee is billed.

The first system described above, however, suffers poor performance in collecting information service fees, because payment of the fees is entirely dependent on the user's will. The second system of using a de-scrambler puts the burden of installing the de-scrambler on the receiver of the signals, incurring extra cost to the user. This can restrict the commercial expansion of the number of subscribers.

The conventional fee systems are generally fixed monthly fee systems, which do not allow fees to be flexibly set depending on type of information, and also do not allow flexibility in the timing of the payment. This prevents the information provider from intensively broadcasting costly pieces of information only, from the commercial point of view. If the information provider does limit the broadcasting of popular information or programs in this manner, no commercial expansion in subscription is expected.

Those who particularly need information management for each individual customer are public utility suppliers such as companies or entities that provide electricity, gas or water services. Every household and office essentially requires water and energy supply such as gas and electricity. Public utilities rates for these items are now collected separately on an individual basis. An information provider may efficiently collect fees if the information service fee mentioned above were added to the utility rate of any item and then the combined fees are collected together. Such an efficient fee collection system may allow the information provider to recover costs for an investment as scheduled. With fees collected as scheduled, the information provider may have a good chance of scheduling operation of his capital which may be invested further to provide even more value-added information to subscribers.

In the present form of fee collection system for public utility services, each consumer is equipped with a utility meter which indicates how much electricity, gas or water has been consumed. The consumer is billed for the amount indicated. More specifically, a public utilities company periodically reads the meter of each consumer for the difference between the current reading and the previous reading, and bills the charge corresponding to the difference to each consumer. In this case, a reader must go to each consumer's place for reading meters one by one.

In present day environment a vast amount of information is now exchanged in a fast and accurate manner by electronic telecommunications means. Thus the reading of utility meters that are used as a basis for fee calculations may not have to depend upon readers. In other words, public utilities companies may not need a number of readers dedicated to meter reading operation, may save time and cost required for the operation, and may save a vast amount of personnel expenses. This may help restrict price rising of public utilities service, leading to economical benefit to every consumer.

SUMMARY OF THE INVENTION

It is a first object of the present invention to provide a billing system which allows proper billing on the basis of the frequency of access of information and unit prices of individual pieces of information a user receives, with a monthly fee system not necessarily being used.

It is a second object of the present invention to provide a billing system in which an information service fee is added onto the public utilities rate of water, electricity or gas supplies and the summed amount is billed and collected in an assured manner.

It is another object of the present invention to provide a billing system in which, contrary to the manner employed in the second object, any item of public utilities rates is added onto the information service fee and the summed amount is billed and collected, wherein the billing system is an integrated system covering a plurality of services which a user or consumer has used.

To achieve the above objects, the present invention essentially comprises a main unit made up of a host computer for storing various types of data and a transceiver unit for a radio link, and a plurality of terminal units for receiving the various types of data, wherein the main unit transmits each of the various types of data tagged with its unique data identification code; each of the plurality of terminal units, having its own unique terminal identification code, stores sequentially all data identification codes of the data read into the terminal unit out of the data transmitted from the main unit. Upon receiving the control signal which the main unit transmits at regular intervals to request the transfer of utilization status information, each of the plurality of the terminal units forms data streams comprising stored data identification codes, each including terminal identification code.

In another aspect, the present invention comprises a main unit equipped with a database of toll value-added information, transmits requested information retrieved from the database in response to a request of any of a plurality of terminal units. The plurality of terminal units which receive the toll value-added information sent in response to their own requests and then perform the required processing. The main unit has an input port in a request receiver block to which a telephone line is directly coupled, and further comprises an acting value-added information service billing line. The plurality of terminal units have their own unique terminal identification codes, and value-added information transmitted from the main unit includes the terminal identification code of a requesting terminal unit, and fee information corresponding to the value-added information transmitted, the requesting terminal unit. After completion of processing the received value-added information, the terminal unit sends the fee information to the main unit via the telephone line, and the main unit connects the input port to the acting value-added billing line for a duration of time according to the fee information received.

In yet another aspect, the present invention comprises a main unit made up of a host computer for storing data of various types and a transceiver unit for radio link, and a plurality of terminal units for receiving the data of various types. The main unit transmits data tagged with its unique data identification code. Each of the plurality of terminal units is provided with a utilization status counter for storing data identification codes of data actually used. The terminal unit calculates a service fee based on the stored data identification codes in the utilization status counter referring to fee conversion data which the main unit transmits at regular intervals. The service fee information is sent to a fee conversion adaptor connected to the terminal unit. The signal provided from the adaptor is used to control the meter which indicates the public utilities rate of typically, the consumption of any one of electricity, gas and water supplies.

In a further aspect, the present invention comprises a main unit made up of a host computer for storing various types of data and a transceiver unit for radio link, and a plurality of terminal units for receiving the various types of data, wherein the main unit is coupled to the plurality of terminal units via both a radio link and a telephone line. Each of the plurality of terminal units is provided with a digital meter which measures consumption of one or more types of public utilities services, typically electricity, gas and water supplies, and is further provided with a memory for storing a consumed amount as consumption data. Each of the plurality of terminal units is provided with means which uploads the consumption data stored in the memory to the main unit via the telephone line in response to a control signal which the main unit transmits as a satellite signal; and each of the plurality of terminal units is provided with delay means which determines the timing at which each of the plurality of terminal units accesses the main unit and each delay means provides a different delay time constant.

BRIEF DESCRIPTION OF THE DRAWINGS

FIG. 8 shows the data structure according to the third embodiment of the present invention.

DETAILED DESCRIPTION OF THE PREFERRED EMBODIMENT

Figure 1:
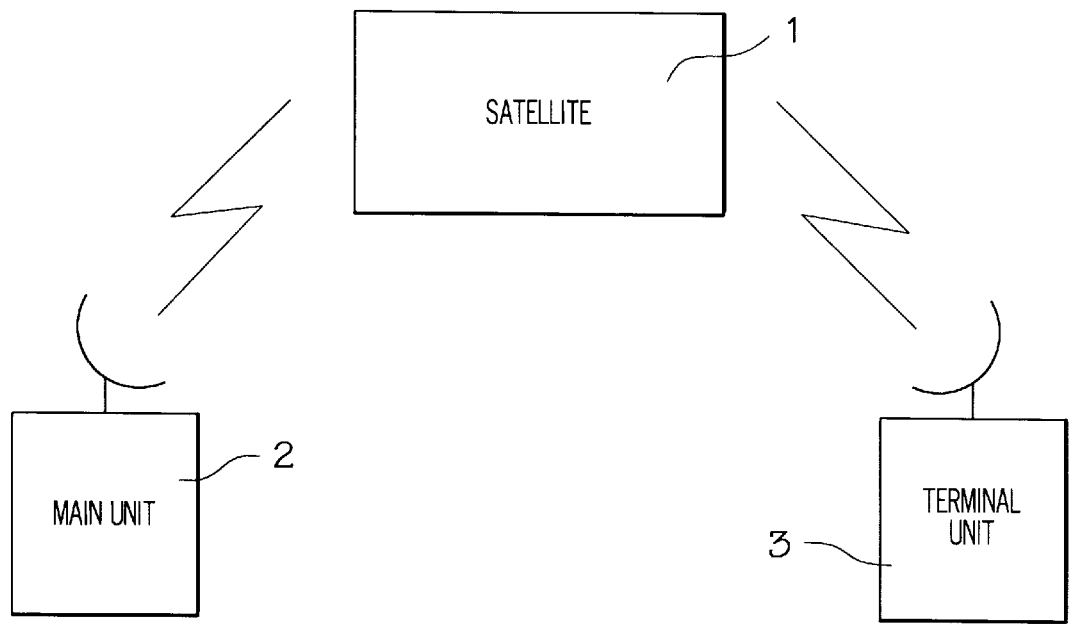
FIG. 1 is a block diagram showing generally the present invention.
Figure 2:
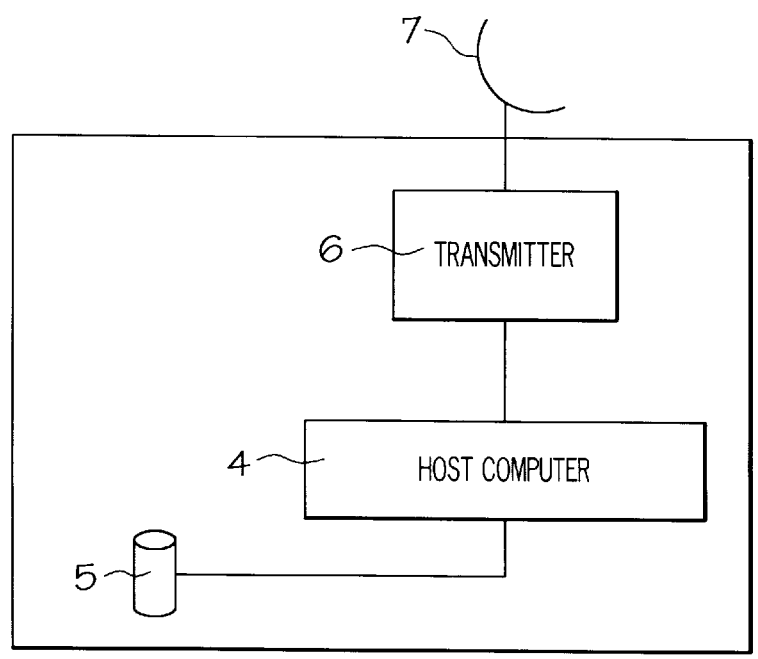
FIG. 2 is a block diagram showing the main unit of the present invention.

Referring now to the drawings, embodiments of the present invention are discussed below. FIG. 1 is a block diagram showing the first embodiment of the present invention, wherein satellite communications are employed. The first embodiment of the present invention comprises a communications satellite 1 at a determined orbit, a main unit 2 at the transmitter side functioning as a host station, and a receiving terminal unit 3 provided for each user. Although a single terminal unit 3 is shown in FIG. 1, a plurality of terminal units, in practice, may be provided in a parallel configuration. As shown in FIG. 2, the main unit 2 essentially comprises a host computer 4, a database 5 under the control of the host computer 4, a transmitter 6, and an antenna 7 for satellite communications. Multichannel broadcasting is possible by setting up a plurality of channels if the transponder of the satellite 1 is fully utilized. In this case, the main unit 2 assigns different types of information to different channels, and transmits multichannel signals to the communications satellite 1. A variety of information may be assigned to the plurality of channels. For example, in karaoke music, a tune is assigned to one channel with its associated words assigned to another; and in computer video game, data and programs are assigned to separate channels. In these examples, the user is afforded a choice of which channel to select.

Figure 3:
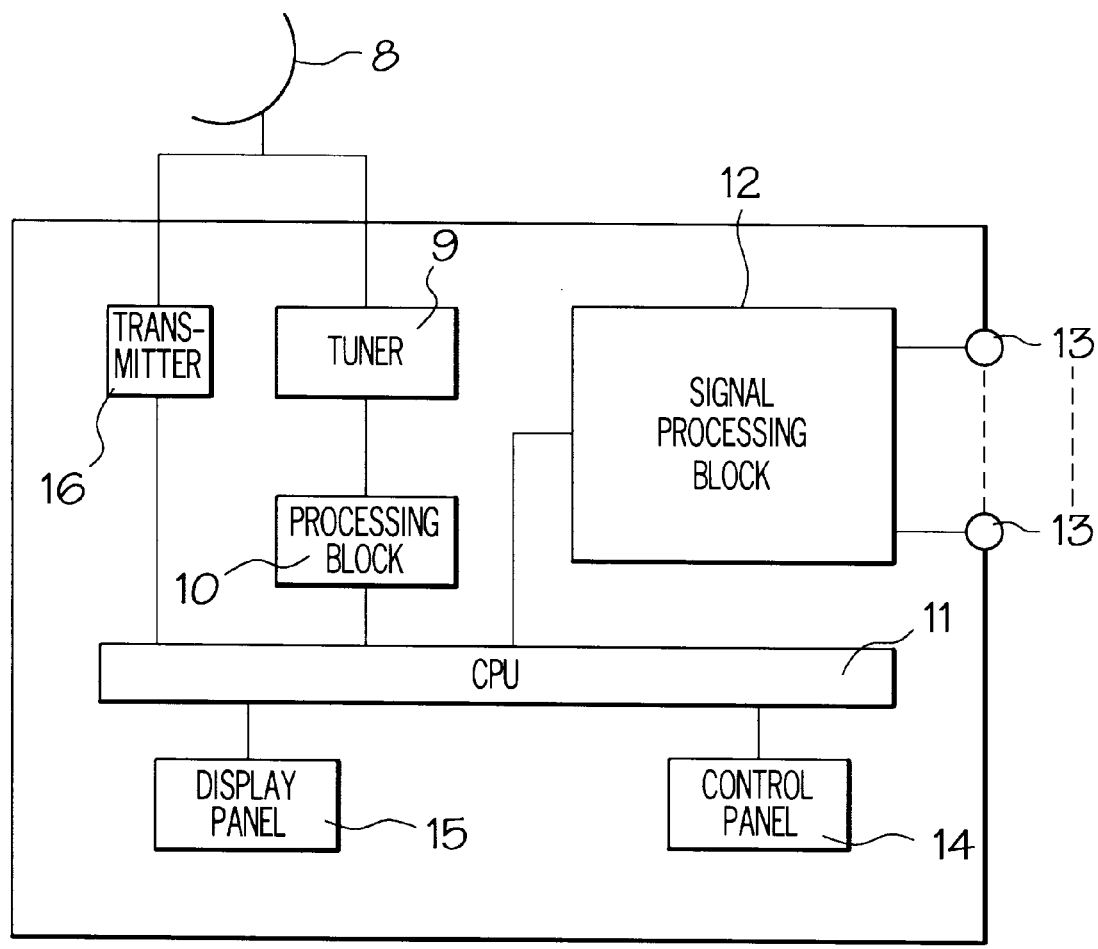
FIG. 3 is a block diagram showing a terminal unit of the present invention.

Referring now to FIG. 3, the construction of a terminal unit 3 is detailed below. Via a receiving/transmitting antenna 8, a tuner 9 receives satellite signals derived from the main unit 2. The transmitted signals can be image data such as video signals and digital signals such as data required for the operation of karaoke or computer video games. It is assumed that the tuner 9 has a structure capable of receiving simultaneously a plurality of channels. A received data processing block 10, having memory means such as a buffer memory, saves temporarily each received data when multichannel signals are simultaneously processed. The received data processing block also processes data streams, such as headers and footers, which are used for communication. Furthermore, the received data processing block 10 performs essential processing functions such as de-scrambling the received data and extracting required information if the received data is scrambled. A control CPU 11 controls the entire terminal unit. A signal processing block 12 comprises, in a parallel configuration, a video signal processing circuit, a karaoke signal processing circuit, and video game signal processing circuit, with each circuit processing the corresponding type of received signal. The signal processing circuits have as many respective output terminals 13 as required. To pick up the video output, a display unit is simply connected to the video output terminal. To enjoy computer video games, a video game machine is simply connected to the video game output terminal. A control panel and a display panel are designated 14 and 15, respectively. Keys disposed on the control panel 14 are manipulated to select desired information displayed on an information listing presented on the display panel 15. A transmitter 16 sends the data regarding the information services which the terminal unit 3 has received to the main unit 2. A radiowave bearing the data is transmitted through the antenna 8 of the transmitter 16.

Described below is the operation of the billing system for toll information service which are exchanged between the main unit 2 and the terminal unit 3. Each terminal unit has its own unique terminal identification code (ID). The main unit 2 transmits various types of information (data) on different channels. Each data the main unit 2 transmits contains a unique data identification code. When the terminal unit 3 receives the data and processes them, CPU 11 or a memory block (not shown) under the control of CPU 11 stores the utilization information. Next, the main unit 2 transmits to the terminal unit 3 at regular intervals a control signal to request the sending of utilization information. Upon receiving the control signal, the terminal unit 3 constructs the utilization information, such as data identification codes, that have been stored since the penultimate control signal, into data streams, by adding a header and a footer to each data stream, and then transmits the data stream to the main unit 2. In this case, the terminal ID unique to each terminal unit is included as additional information in the data stream. Receiving the data stream from the terminal unit, the main unit 2 recognizes the ID, and performs the required processing to the utilization information on a per ID basis to calculate service fee at regular intervals.

Several methods are available to calculate service fee from utilization status information, and the system administrator can select which method to use. In a first method, the utilization information contains information that indicates the frequency of utilization per data based on the data identification code information. The main unit 2 stores, as a data table, a service fee pricing table that is itemized by each data identification code, and the main unit 2 determines the billing sum by referring to the data table. In a second method for calculating the service fee, each terminal unit 3 performs a service fee calculation. Each terminal unit 3 stores a data table identical to the one in the main unit in the first method, and refers to the data table in response to a control signal received from the main unit 2 to sum service fee. Each terminal unit then sends the data indicative of the resulting sum. The second method provides to the user a convenience which allows the user to monitor utilization status by checking summed service fee. This embodiment is exemplified in satellite communications. Alternatively, however, other radio communications such as FM radio communications may replace satellite communications without any modification in essential system configuration of the embodiment.

In the first embodiment for calculating the service fee, the main unit 2 offers an immediate monitoring of the utilization status of each terminal unit, and no manual intervention is required in the calculation of service fee. If the summed service fee is output in hardcopy in a proper bill format, that bill format may be directly used as an actual bill, saving the of cost and labor involved in the issuance of bills. It is also contemplated that the utilization status information of each terminal unit is uploaded via a telephone line rather than via a radio link. This may occupy partly the operation time that would be otherwise entirely available for normal telephone service. If the efficiency problem in traffic is not very important, however, there are no other major problems against the use of the telephone line.

Figure 4:
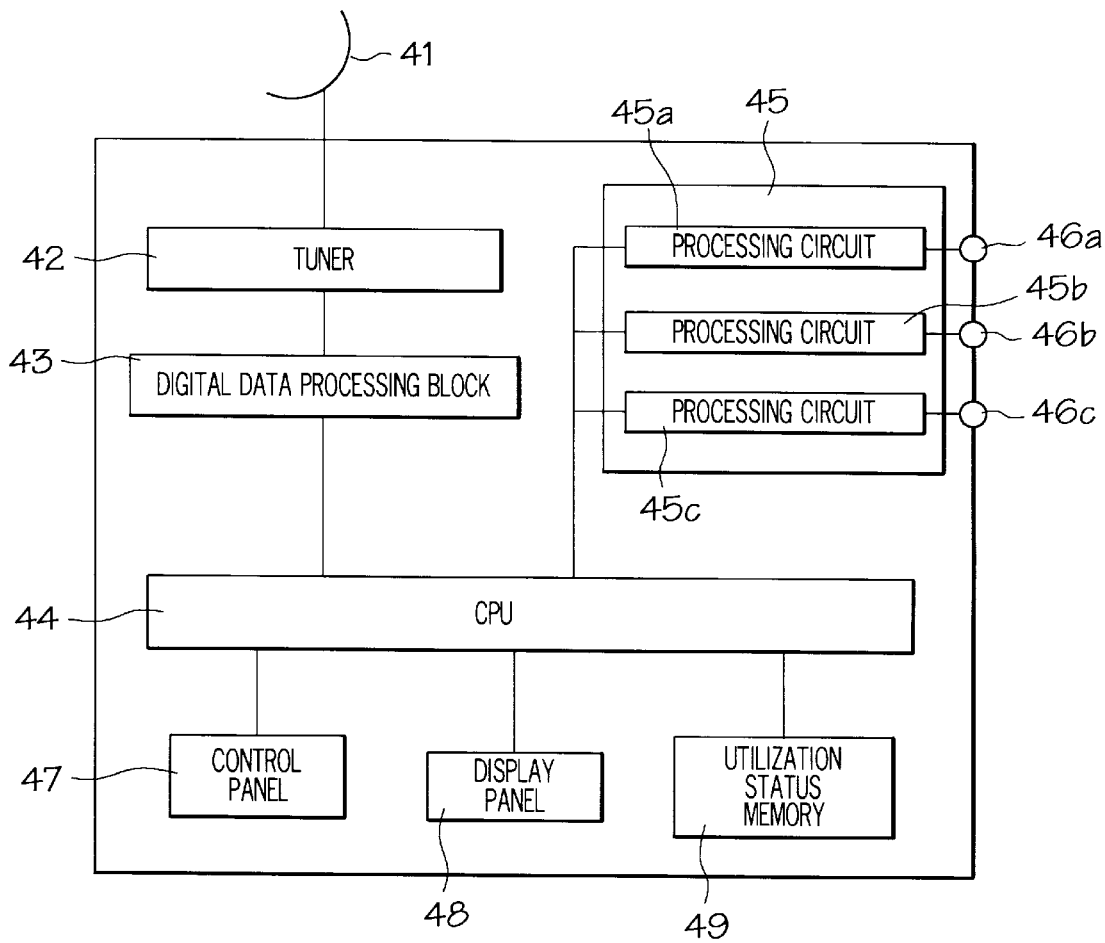
FIG. 4 is a block diagram showing a terminal unit according to the second embodiment of the present invention.

Next, the second embodiment of the present invention for efficient billing of information service fee will be discussed below. The essential configuration of the second embodiment is identical to that shown in FIG. 1. The structure of the main unit is identical to that of FIG. 2. The configuration of the terminal unit is shown in FIG. 4. In the figure, a tuner 42 is connected to a receiving antenna 41 to receive the signal (data) transmitted from the main unit 2. It is assumed that data to be transmitted can be digitized data such as data associated with video, karaoke and video game. A digital data processing block, indicated at 43, comprising a buffer memory and the like, decodes the satellite signal provided by the tuner 42 into a valid digital signal, processes the headers and footers which have been used for communications, and extracts required information from data streams. A control CPU 44 controls the entire terminal unit. A signal processing block 45 comprises, in a parallel configuration, a digital video signal processing circuit 45a, a digital karaoke signal processing circuit 45b, and a digital video game signal processing circuit 45c, with each circuit processing the corresponding type of received signal. The signal processing circuits have respective output terminals 46a, 46b and 46c. To pick up the video output, a display unit is simply connected to the video output terminal. To enjoy computer video games, a video game machine is simply connected to the video game output terminal. A control panel and a display panel are designated 47 and 48, respectively. Keys and buttons disposed on the control panel 47 are manipulated to select desired information that is presented on the display panel 48. The above configuration remains essentially unchanged from the first embodiment in FIG. 3, except that the first embodiment is provided with the transmitter 16 used for transmission from the terminal unit 3 to the main unit 2. No transmitter is included in the terminal unit in the second embodiment.

Figure 5:
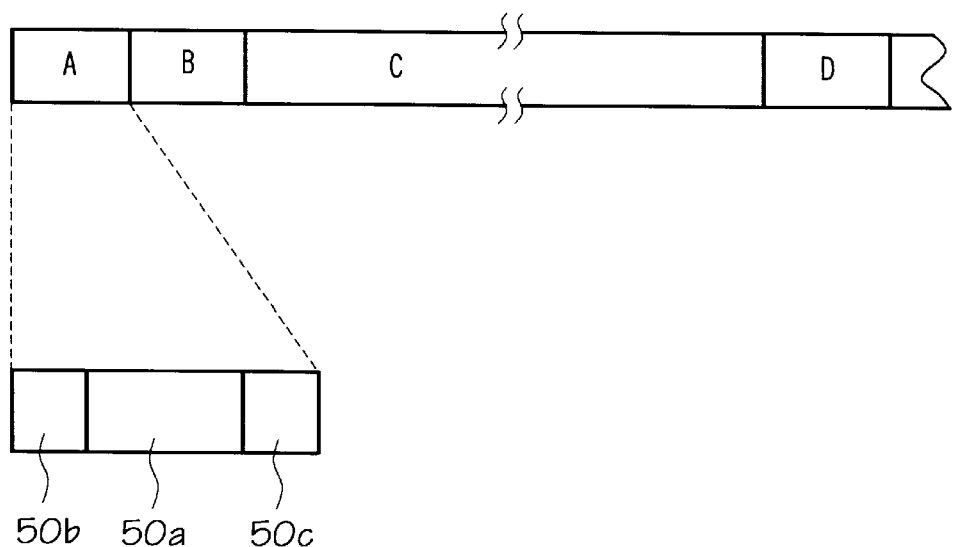
FIG. 5 shows the structure of data transmitted and received in the second embodiment of the present invention.

Next, the operation of the billing system of information service fee is discussed. In Fig. 4, a utilization status memory 49 counts the use of each signal processing block 45 and stores the total count per signal processing circuit. Total service fee per any desired period of time is calculated based on the stored count of utilization for each block. Each frame of digital data contains a data identification code corresponding to the type of information. The structure of one data frame is illustrated in FIG. 5. It is assumed that a single channel handles digital data formed of information types A through D. Information type A is sound data, type B is video game data, type C is image data, and type D is karaoke data. The image data C includes digitized video data. Each data consists of a data body 50a, a header 50b and a footer 50c. The header 50b contains a data identification code, as pricing information, as well as control information. Each data identification code indicates whether the service of the data is chargeable by unit of data or by unit of time. For example, in a data type having a relatively small amount of data, typically video game data, reading the entire data at one time and then processing it in a receiver side is not only an easy process but also an essential requirement, because of the structure of the data. Thus, the service fee may be priced by unit of data, and the corresponding data identification code is added. On the other hand, in a data type having a vast amount of data, typically image data, reading the entire data at one time and then processing it results in poor efficiency. Thus, data streams have a structure such that an automatic interrupt, such as the suspension of execution, is allowed. The service fee is priced by time, and thus the corresponding data identification code is added. The data identification code described above is judged by the digital data processing block 43, and the utilization status memory 49 stores the data identification codes of the data, which are processed by the control CPU 44, out of all the received data. This storage is performed separately on a per data type basis. Once the information service fee is calculated, for example, based on the fee conversion data received from the main unit, the information service fee data may be uploaded to the main unit via a telephone line, and the main unit may bill the total fee at regular intervals. For payment of information service fees, IC cards such as a pre-paid card may be employed at the terminal unit. Payment method is not very important in the context of the present invention.

Digitized data of various types of information are exchanged in the second embodiment as described above. With the aid of computers, a sender side (an information provider) can relatively easily control and transmit in a digital form a medium containing a vast amount of information, such as image data, thereby achieving fast and high-quality communications. A receiver side (a user of information service) can process and execute the received data at a high speed, and benefits from many applications of the received data. A transmitted signal is associated with data identification codes to identify the type of data, and the utilization status memory provided in the terminal unit stores the data identification codes of the data, which have been actually used, out of all the received data. Thus, the present invention provides an efficient billing system in which the information provider can bill an amount that accurately reflects the services actually provided.

Figure 6:
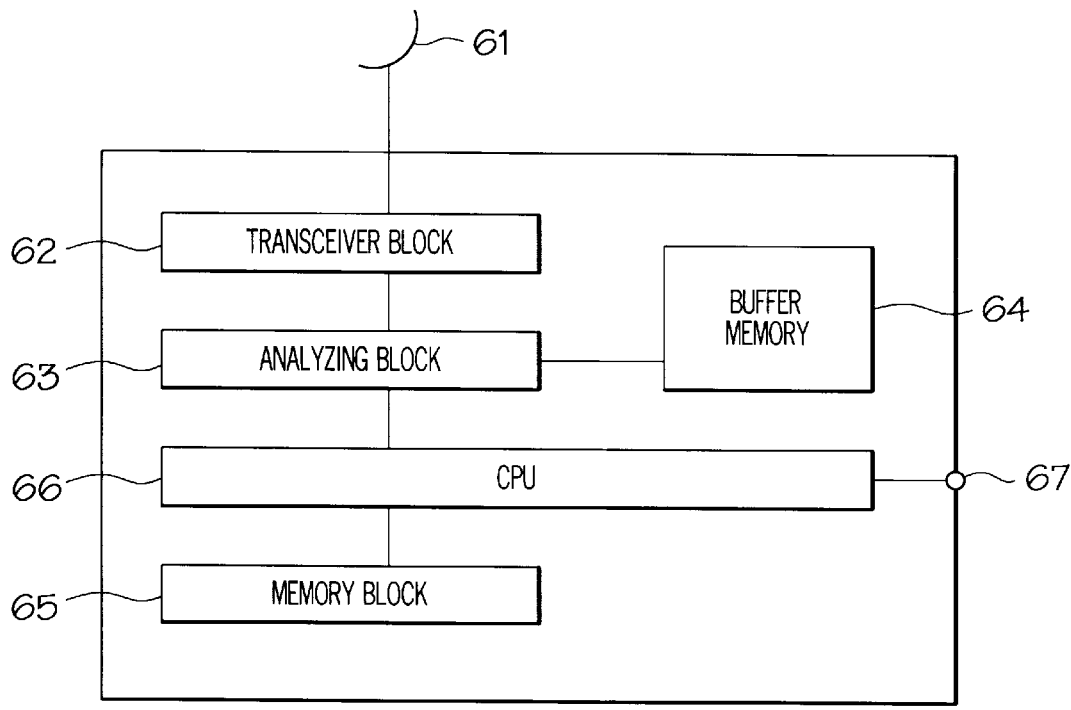
FIG. 6 is a block diagram showing a terminal unit according to the third embodiment of the present invention.
Figure 7:
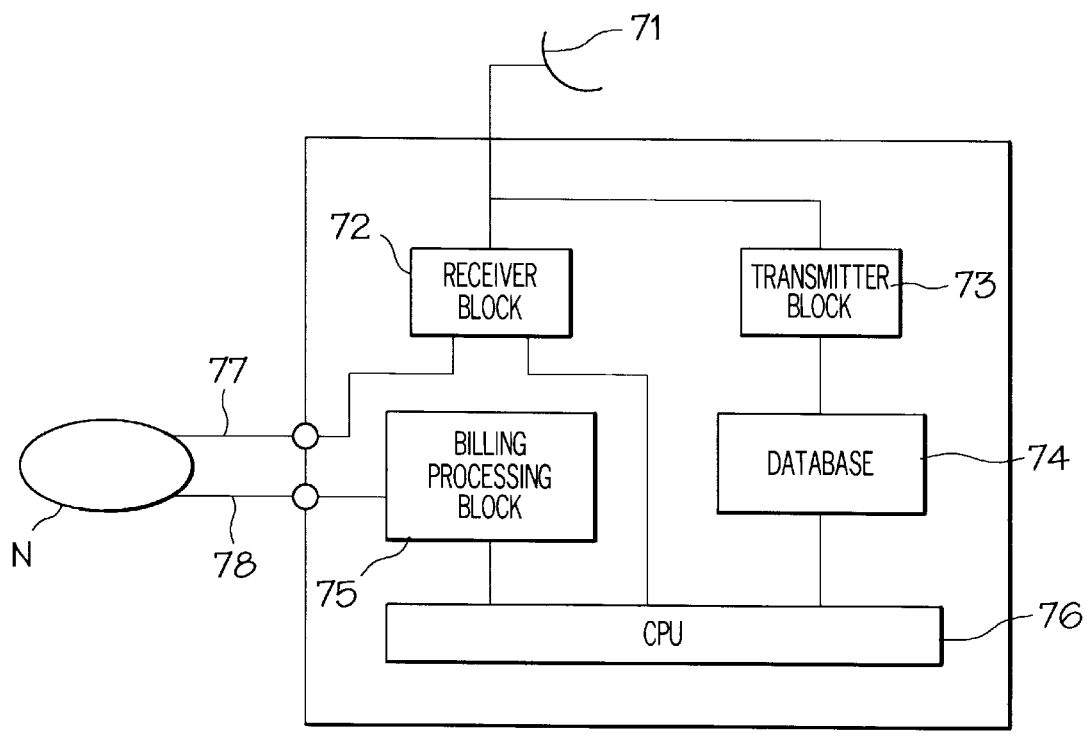
FIG. 7 is a block diagram showing the main unit according to the third embodiment of the present invention.

Discussed next is the third embodiment of the present invention. FIG. 6 is a block diagram of a user device, namely, a terminal unit. The terminal unit comprises a transmitting/receiving antenna 61, a transceiver block 62 for satellite signals, an analyzing block 63 for analyzing satellite signals, a buffer memory 64 for storing temporarily transmitted or received data, a memory block 65 for storing transmitted data and received data, and a control CPU 66 for controlling the entire unit to perform the required processing to data. An output port 67 is used to couple the terminal unit with external devices. Referring to FIG. 7, the configuration of the main unit working as a host station is described below. The main unit comprises a transmitting/receiving antenna 71 for the host station, a receiver block 72 for receiving signals from the terminal unit, a transmitter block 73 for transmitting control signals as well as transmitting information that the terminal unit requests, a database 74 for storing user information and information to be supplied to the terminal unit. The main unit also includes an acting billing processing block 75 for billing the information service fees for value-added information via a public telephone line. The bills are based on the fee information sent from the terminal unit of each user. The main unit includes a CPU 76 for controlling each block of the host station. The host station is linked to an acting value-added billing network N owned by a public telephone company. Also shown in the figure are a normal telephone line 77 and an acting value added billing line 78. In this application, the acting value-added billing is defined as the manner in which when a user calls a host station as an information provider at a particular telephone number, an information service fee on a unit of time basis is added to normal telephone line fee while the line is connected, and the telephone office has responsibility for collecting the summed fee. If the terminal unit in FIG. 6 is of a type which is capable of receiving a plurality of data types, the terminal unit may include a plurality of signal processing circuits arranged in a parallel configuration.

Figure 8:
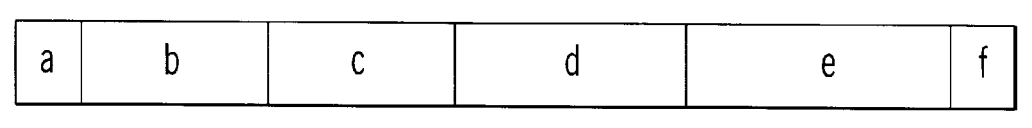

In order for the host station to collect the information service fee from the terminal unit of a user in the system described above, the host station must first register its own acting value-added billing line 78 at the telephone office, and get an authorized number. When the terminal unit requests toll information stored in the database by sending a data identification code to the host station, the host station verifies the data identification code and then transmits the requested information to the main unit according to a predetermined communication protocol. FIG. 8 shows an example of the structure of the transmitted data. The data includes a header a, followed by terminal address information b including a terminal ID, data type information c including data type information identifying the type of transmitted data and an information service fee, a body of data d, an error correcting code e and a footer f. As seen from the data structure, packet communication, in principle, is used to prevent error in data transfer. After receiving the data, the terminal unit matches the terminal address information c against its own ID. Any packet having a match is received and processed by the control CPU 66. The satellite signal analyzing block 63 skips in its reading operation any packet having no match with its own ID, thereby avoiding unauthorized use of information service.

When the terminal unit has received data in a sound state without disturbance on them, the terminal unit transmits the information service fee data of the data type information c to the host station. Receiving the information service fee data from the terminal unit at its receiver block 72, the host station connects the input port to the telephone line to call the acting value-added billing line 78 with which the host station has been registered. It should be noted that the information service fee is billed as per the duration in which the input port remains connected to the acting value added billing line 78. Either the host station or the terminal unit translates the information service fee into time, and during the resulting time the acting value-added billing line 78 is connected. The telephone line 77 is considered as the telephone line which is utilized by the terminal unit, since the input port is released according to the received data from the terminal unit. In this embodiment, a billing operation is performed each time the terminal unit requests toll information service. Alternatively, for convenience, the terminal unit may upload the information service fee data to the host station at regular intervals.

In the third embodiment, the host station performs billing operation based on the data received from the terminal unit after verifying that the terminal unit has received valid data of toll information, rather than when the transfer of the toll information to the terminal unit is completed. This is for communications security reasons. By basing billing on the information derived from the terminal unit, potential problems in connection with fee calculations are avoided. The system of the third embodiment allows the information service fee billing operation to be performed with the terminal unit playing a major part in the process with the aid of satellite bidirectional communications. Thus, problems involved in fee calculations are greatly reduced, as compared with the system in which the host station calculates the information service fee. Furthermore, since the telephone office functions as an agency for billing and collecting information service fee, the host station is freed from billing operations. Thus, efficient information providing results. Since telephone lines are required only between the host station and a regional telephone office in charge, this system is readily installed to a place where there has been difficulty installing a telephone line. This system can thus expand the toll information service of various types.

Figure 9:
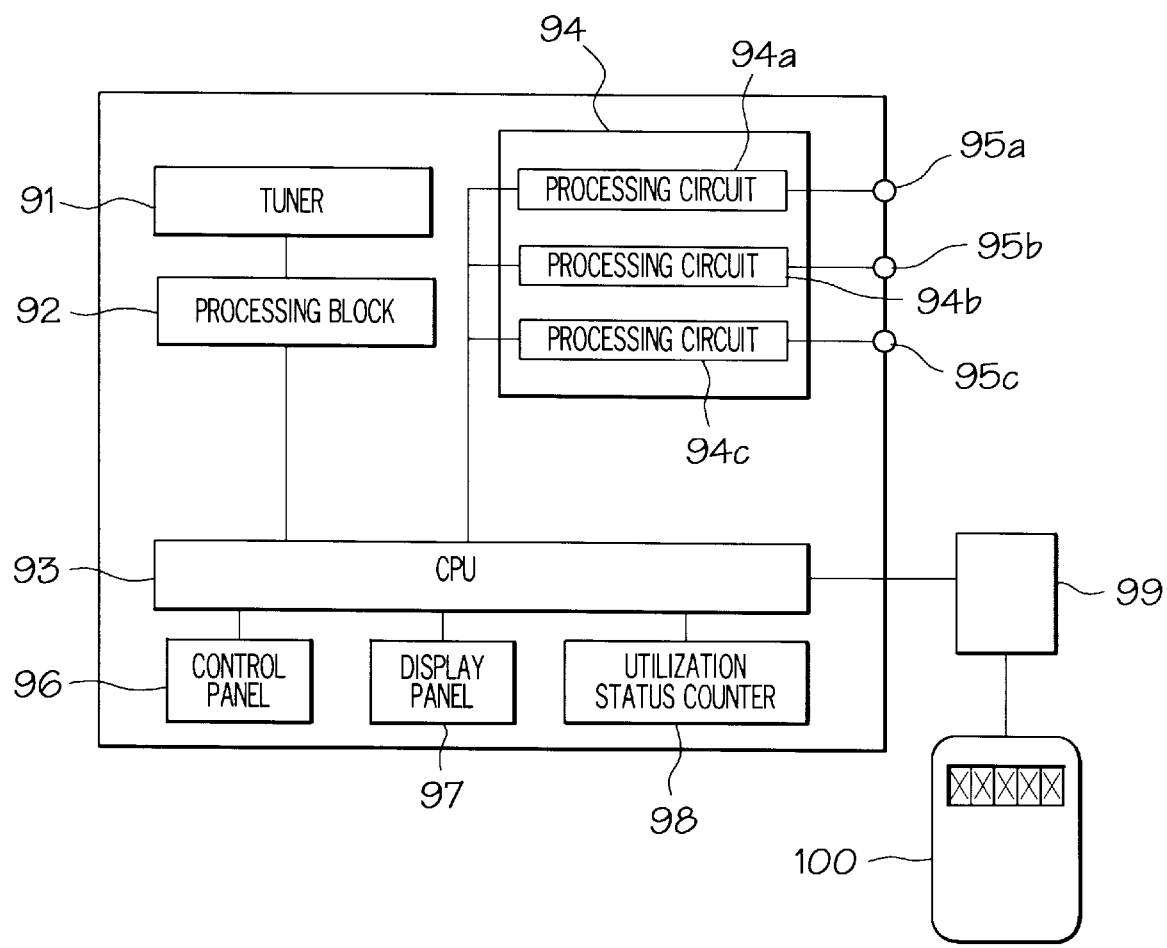
FIG. 9 is a block diagram showing a terminal unit according to the fourth embodiment of the present invention.

In the systems described above, the fee of value-added information is singly billed. The inventors are now disclosing the fourth embodiment in which the information service fee is integrated into the public utilities rate system of electricity, gas, water supplies and the like, and the total sum is billed and collected. The system in this embodiment uses the essential configuration shown in FIG. 1, wherein a main unit communicates with each terminal unit via a satellite. Different from the counterpart in preceding systems is the terminal unit, possibly installed at home. FIG. 9 shows the terminal unit. A tuner, indicated at 91, is a device for receiving the signal transmitted from the main unit 2. Although no antenna is shown in FIG. 9, an antenna is required if satellite communications are employed. Like the preceding embodiments, signals to be transmitted may be in the form of video signals when image data is handled, and may be in the form of digital signals when karaoke or video game data are handled. A tuner 91 is capable of receiving simultaneously a plurality of channels. A received data processing block 92 having a buffer memory performs essential functions, such as saving temporarily each data when multichannel signals are simultaneously received, processing data streams including headers and footers, and extracting required information from the received data. A control CPU 93 controls the entire terminal unit. A signal processing block 94 comprises, in a parallel configuration, a video signal processing circuit 94a, a karaoke signal processing circuit 94b, and video game signal processing circuit 94c, with each circuit processing the corresponding type of received signal. The signal processing circuits have respective output terminals 95a, 95b, and 95c. A control panel and a display panel are designated 96 and 97, respectively. Keys disposed on the control panel 96 are manipulated to select desired information presented on the display panel 97.

The operation of the billing system according to the fourth embodiment is now described. In FIG. 9, a utilization status counter 98 counts the use of each signal processing block 94 and stores the total count per signal processing circuit. Information service fees are calculated based on the stored count of utilization, according to the fee conversion data that is transmitted from the main unit 2 at regular intervals. The data on which the count of utilization is based (namely, the data identification codes used to count the utilizations of each processing circuit) are inserted into the signal to be transmitted by the main unit. For example, each data frame contains the data identification code corresponding to the type of data. Data output by the tuner 91 is processed by the control CPU 93, and the data selected through the control panel 96 is then further processed by the corresponding processing circuit of 94a through 94c. The utilization status counter 98 stores the total number per data identification code as the number of utilization data. When, for example, for a certain period of time karaoke was used N times and video game was enjoyed M times, the utilization status counter 98 stores, as frequency of utilization data, karaoke N, video game M. In addition, the stored data identification codes and the fee conversion data regularly transmitted from the transmitter side are cross-referenced on a data table to determine the information service fee at regular intervals.

The information service fee is determined by the utilization status counter 98. As soon as the information service is determined, it is sent, in the form of digital signal, to a fee conversion adaptor 99. The fee conversion adaptor 99 is connected to an AC watthour meter 100 to control it. A household integrating wattmeter that is in widespread use is an AC integrating wattmeter which employs the induction of a shifting magnetic field. An integrating wattmeter is typically made of an aluminum disk, potential and current coils, and a counting device. The aluminum disk rotates at a speed proportional to the product of the magnetic flux of the potential coil and the magnetic flux of the current coil, with both coils connected to a network to be measured. A watthour is measured by counting the number of revolutions of the aluminum disk. Thus, the wattmeter is an analog machine. In this embodiment, to control such a conventional integrating wattmeter, the fee conversion adaptor 99 converts the digital information service fee data into analog data which are applied to the integrating wattmeter 100 to control it. More specifically, the information service fee output is converted from a digital form into a current that corresponds to a level of power consumption that is equivalent to the information service fee using the number of revolutions of the aluminum disk as a parameter. The resulting current is applied to the integrating wattmeter 100. The information service fee determined in the terminal unit is thus sent, in the form of current, to the integrating wattmeter. The wattmeter therefore indicates the total watthour, and consequently a utility company bills and collects the integrated fee including the information service fee. This embodiment adopts a known system in which the utility company pays to the information provider the amount with the actual electricity rate plus agent service charge deducted. The host station preferably transmits the fee conversion data to each terminal unit in synchronism with billing time or meter reading time. In summary, in this embodiment the information service fee is determined based on the type of information provided, and the total information service fee for a predetermined period of time is converted into watthour amount, and the current value corresponding to it is sent to the integrating watthour meter.

In the fourth embodiment, the fee conversion adaptor 99 converts the information service fee into a current which can be directly convertible to watthour amount. The fee conversion adaptor 99 applies the resulting current to the AC integrating wattmeter 100. To achieve an improved efficiency in billing, however, the information service fee may be supplied to an integrating meter of utilities other than electricity.

Figure 10:
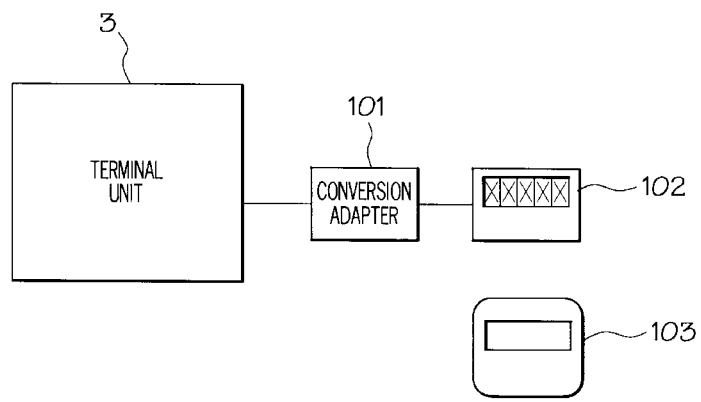
FIG. 10 is a block diagram showing an alternative to the fourth embodiment of the present invention.

FIG. 10 shows an alternative embodiment to the fourth embodiment, wherein a digital integrating meter, replacing an analog integrating meter, indicates the utility rate of any one of electricity, gas and water supplies, and the information service fee is supplied to the digital integrating meter. Shown in FIG. 10 are a fee conversion adaptor 101, a digital integrating meter 102 and an analog integrating meter 103 which indicates the utility rate of any one of electricity gas and water supplies. The terminal unit 3, which is used to provide information service and then indicates the service fee involved, is identical to the one used in the fourth embodiment where the AC watthour meter 100 is employed. The fee conversion adaptor 101, connected to the digital integrating meter 102, converts the information service fee into a digital signal equivalent to any one of the consumed amounts of watthour, gas volume and water volume, depending on the type of utilities service the meter is intended for. Namely, the fee conversion adaptor 101 converts the information service fee into the amount compatible with the integrating meter 102 in use, and controls the integrating meter 102. If an already existing analog integrating meter 103 is used in parallel, the billing operations are performed according to the frequency of utilization.

In this embodiment, the information service fee is converted into data compatible with the integrating meter of a public utilities service, typically electricity, gas or water supply, and each utility company bills and collects the total fee. The user therefore may get information service without altering the payment method for the conventional utilities service. The information provider benefits from improved fee collection rate.

Figure 11:
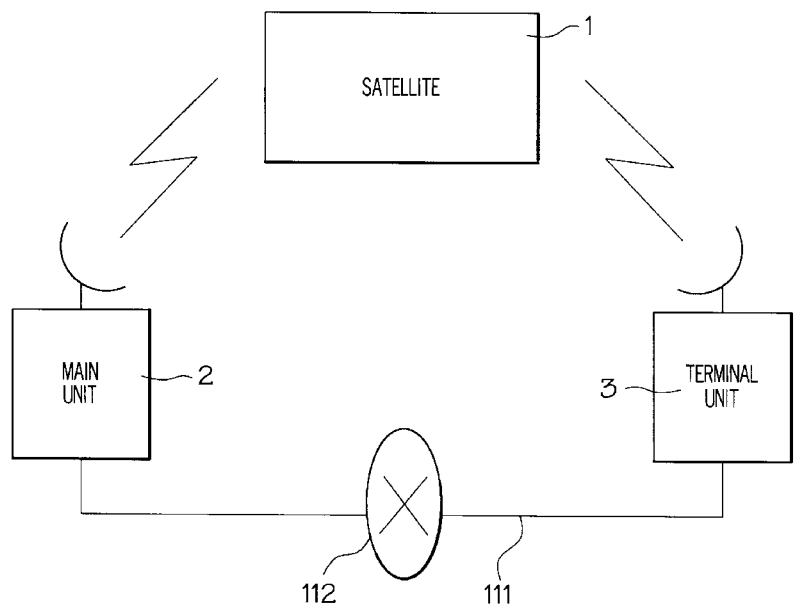
FIG. 11 is a block diagram showing generally the entire system according to the fifth embodiment of the present invention.
Figure 12:
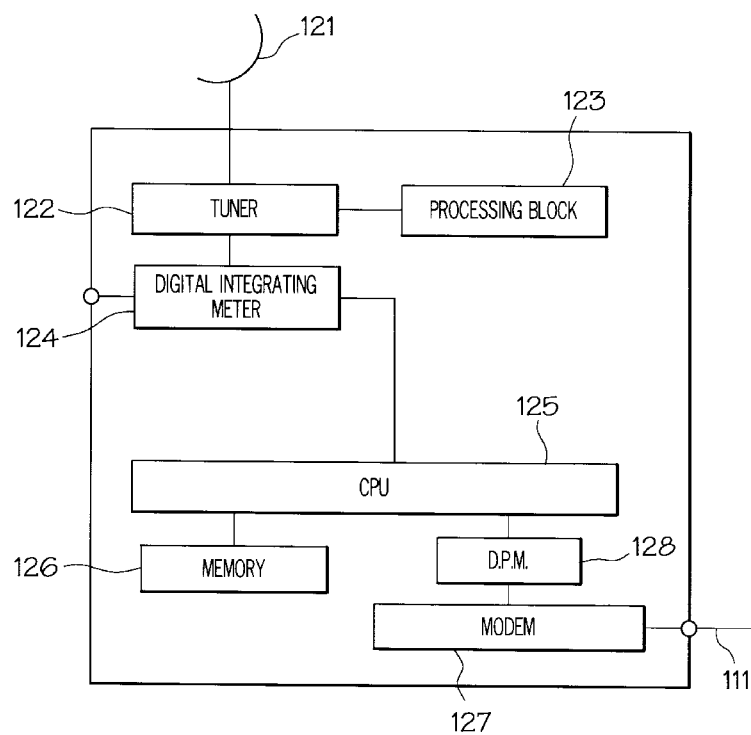
FIG. 12 is a block diagram showing the terminal unit of the system of FIG. 11.

The fourth embodiment presents the system in which the information service fee is added onto the public utilities rates. The fifth embodiment presents the system in which a public utilities rate only is efficiently billed and collected. FIG. 11 is a block diagram showing the entire system. Shown in the figure are a communications satellite 1, a main unit 2 at the transmitter side, and a terminal unit 3 at the receiver side, and these are identical to those already described in the preceding embodiments. Also shown are a telephone line 111 and a telephone network 112, and the telephone line 111 serves as a communications link between the main unit 2 and the terminal unit 3. The main unit 2 has the configuration identical to that of the first embodiment shown in FIG. 2. The main unit 2 transmits a control signal to the terminal unit 3 via the communications satellite 1. The control signal essentially contains a command for causing the terminal unit 3 to upload the utilization status data stored to the main unit 2. No particular requirements, for example, requirements of signal specifications, are imposed on the control signal. When there are a large number of subscribers, the control signal is preferably in a digital form. Referring to FIG. 12, the internal structure of the terminal unit 3 is detailed below. A tuner 122 receives satellite signals via a receiving antenna 121, namely the control signal, which is derived from the main unit 2. The system optionally includes a tuner 122 that is capable of receiving not only the control signal, namely text data, but also general signals such as music and image. The use of such a tuner type does not make any difference in the context of the present invention. A received data processing block 123, having a buffer memory, performs essential processing such as saving temporarily each data the tuner 122 has processed, and organizing data streams, such as headers and footers, which are used for communication in order to extract required information only. A digital integrating meter 124 indicates a consumed amount of public utilities service, that is, consumed watthour for electricity, consumed gas volume for gas supply, or consumed water volume for water supply. The digital integrating meter 124 counts the consumed amount in a digital form as utilization data. A CPU 125 controls the entire terminal unit 3. The utilization data counted by the digital integrating meter 124 is stored onto a RAM memory 126 through the CPU 125. The utilization data stored in the RAM 126 is transferred to the main unit 2 via a modem 127 and then the telephone line 111.

In the fifth embodiment, when the terminal unit 3 receives the control signal which the main unit 2 transmits at regular intervals, the telephone number of a subscriber in its coded form is added to the utilization data which is stored in the RAM 126 in the terminal unit 3. Resulting data is output from the modem 127, and transmitted to the main unit 2 via the telephone line 111. Since radio communications are generally of broadcasting nature, the control signal derived from the main unit is simultaneously received by all the subscribers through a satellite link. In practice, however, many terminal units are connected to the transmitter side 2 over the telephone line. If all the subscribers attempt to access the main unit 2 simultaneously to transfer data to the main unit 2, a line busy state occurs frequently, degrading traffic of the line. To avoid this, the assignment of dedicated lines or particular frequencies to subscribers is contemplated. But such a scheme is not only uneconomical but also infeasible in reality when a large number of subscribers are handled. In view of this difficulty, this embodiment allows each terminal unit 3 to contain a delay processing means 128 with different delay time width. A unit of delay time width is set to the duration from the moment the terminal unit 3 accesses the main unit 2 via the telephone line 111, followed by the upload of the utilization data to the main unit 2, to the moment the line is disconnected. A plurality of terminal units 3 are provided with different time widths in steps of unit delay time width. This prevents attempting to access a busy line when the main unit 2 is called simultaneously. The main unit 2 normally possesses a plurality of lines, and, depending on the number of lines, the terminal units may be grouped. In each group of terminal units, delay processing is performed. Several delay processing means are contemplated as follows: a delay is provided by routing data output from the CPU 125 through a delay buffer to the modem; and a delay is provided by altering an arithmetic expression for the internal clock of the CPU 125. Selection of delay means is at the option of the system administrator. Once the utilization data are thus transferred to the main unit 2, the main unit 2 identifies each telephone number, and calculates the utilities rate for each terminal unit 3. The main unit 2 has an internal database in the form of data table indicating unit price for each utilities service. When the main unit 2 receives data, the main unit 2 refers the data to the data table, and calculates the sum. The utilities rate is thus calculated, and the consumer is billed using any proper means.

In this embodiment, a single type of public utilities service is handled. If the digital integrating meter 124 is capable of handling a plurality of types in parallel and if the RAM 126 stores the public utilities rates on a per type basis, the control signal can specify the type of service to allow the terminal unit to upload arbitrarily selected utilization data to the main unit. The transmitter side thus functions as a public utilities rate management system. Once such a system is established, a subscriber who is equipped with a terminal unit needs no modification in the existing public utilities service payment method. The host station can thus perform billing and collecting operations in a timely and smooth manner. Thus, an efficient public utilities rate billing system results.

What is claimed is:

1. A billing system in radio communications comprising:
   a main unit having a host computer with a database for storing data of various types and a transceiver for radio communications, and
   a plurality of terminal units for receiving said data of various types, whereby
   said main unit transmits data tagged with a unique data identification code,
   each of the plurality of terminal units is provided with a utilization status counter for storing data identification codes of data actually processed,
   said terminal unit calculates an information service fee based on the data identification codes stored in the utilization status counter by referring to fee conversion data which the main unit transmits at regular intervals,
   said information service fee is sent to a fee conversion adaptor connected to said terminal unit, and a signal provided from the adaptor is used to control an integrating meter which indicates the consumed amount of a utility.

2. The billing system in radio communications according to claim 1, wherein said integrating meter is an AC watthour integrating meter, and said fee conversion adaptor converts said information service fee into an analog current that has a billable value which is equivalent to the billable value of the information service fee, and said integrating meter is driven by the analog current output by said fee conversion adaptor.

3. The billing system in radio communications according to claim 1, wherein said integrating meter is a digital integrating wattmeter, and said fee conversion adaptor converts said information service fee into an analog current that has a billable value which is equivalent to the billable value of the information service fee, and said integrating meter is driven by a digital signal output by said fee conversion adaptor.

4. The billing system in radio communications according to claim 1, wherein said integrating meter is a digital integrating gas meter, and said fee conversion adaptor converts said information service fee into a value that represents a volume of gas that has an billable value equivalent to the billable value of the information service fee, and said integrating meter is controlled by a digital signal output by said fee conversion adaptor.

5. The billing system in radio communications according to claim 1, wherein said integrating meter is a digital integrating water meter, and said fee conversion adaptor converts said information service fee into a value that represents a volume of water that has an billable value equivalent to the billable value of the information service fee, and said integrating meter is controlled by a digital signal output by said fee conversion adaptor.

6. A billing system in radio communications comprising: a main unit having a host computer with a database for storing data of various types and a transceiver for radio communications, and a plurality of terminal units for receiving said various types of data, whereby said main unit is coupled to said plurality of terminal units via both a radio link and a telephone line, each of said plurality of terminal units is provided with a digital integrating meter which measures the consumed amount of one or more utilities services, wherein each terminal unit is further provided with a memory for storing the consumed amount as consumption data, and each terminal unit is provided with means for uploading the consumption data stored in the memory to said main unit via the telephone line in response to a control signal which the main unit transmits as a satellite signal, and each terminal unit is provided with a delay means which determines the timing at which each of the plurality of terminal units accesses said main unit and each delay means provides a different delay time delay.

7. The billing system in radio communications according to claim 6, wherein said main unit transmits toll value added information to said terminal unit via said radio link, and wherein said terminal unit has means for processing said value added information.

8. The billing system in radio communications according to claim 6, wherein said radio link is a satellite link.

9. The billing system in radio communications according to claim 7, wherein said terminal unit uploads a frequency of utilization of said value-added information and said consumption data to said main unit.

10. The billing system in radio communications according to claim 7, wherein said terminal unit uploads the information service fee of said value-added information and said consumption data to said main unit.

11. A method of billing for transmitted data comprising the steps of:

transmitting data from a main unit to a plurality of terminal units, each of said data being tagged with a data identification code;

storing the data identification codes of data received by each terminal unit in a utilization status counter of each terminal unit;

transferring fee conversion data from said main unit to each terminal unit;

calculating a service fee based on the stored data identification codes in the utilization status counter of each terminal unit by referring to said fee conversion data;

converting said service fee into a signal at each terminal unit; and feeding said signal to an integrating meter at each terminal unit, wherein said signal indicates the consumed amount of a public utility, and wherein said indicated consumed amount is controlled at least partially by said signal.

12. A method of billing for services comprising the steps of:

providing a plurality of terminal units, wherein each terminal unit measures the consumed amount of a utility, and each terminal unit receives various types of data from a main unit;

storing said consumed amount in each terminal unit;

providing a control signal from said main unit to said terminal units; and in response to receipt of said control signal, each terminal unit uploading said stored consumed amount from each terminal unit to said main unit, wherein said each terminal unit is provided with delay means which determines the timing at which each of the plurality of terminal units uploads said consumed amount to said main unit, and wherein each delay means provides a different time delay to its associated terminal unit such that each terminal unit uploads to said main unit at a different time.

13. The method of claim 12 wherein said main unit can communicate with said terminal units by both a radio link and a telephone line.

* * * * *